Feb. 2, 1954

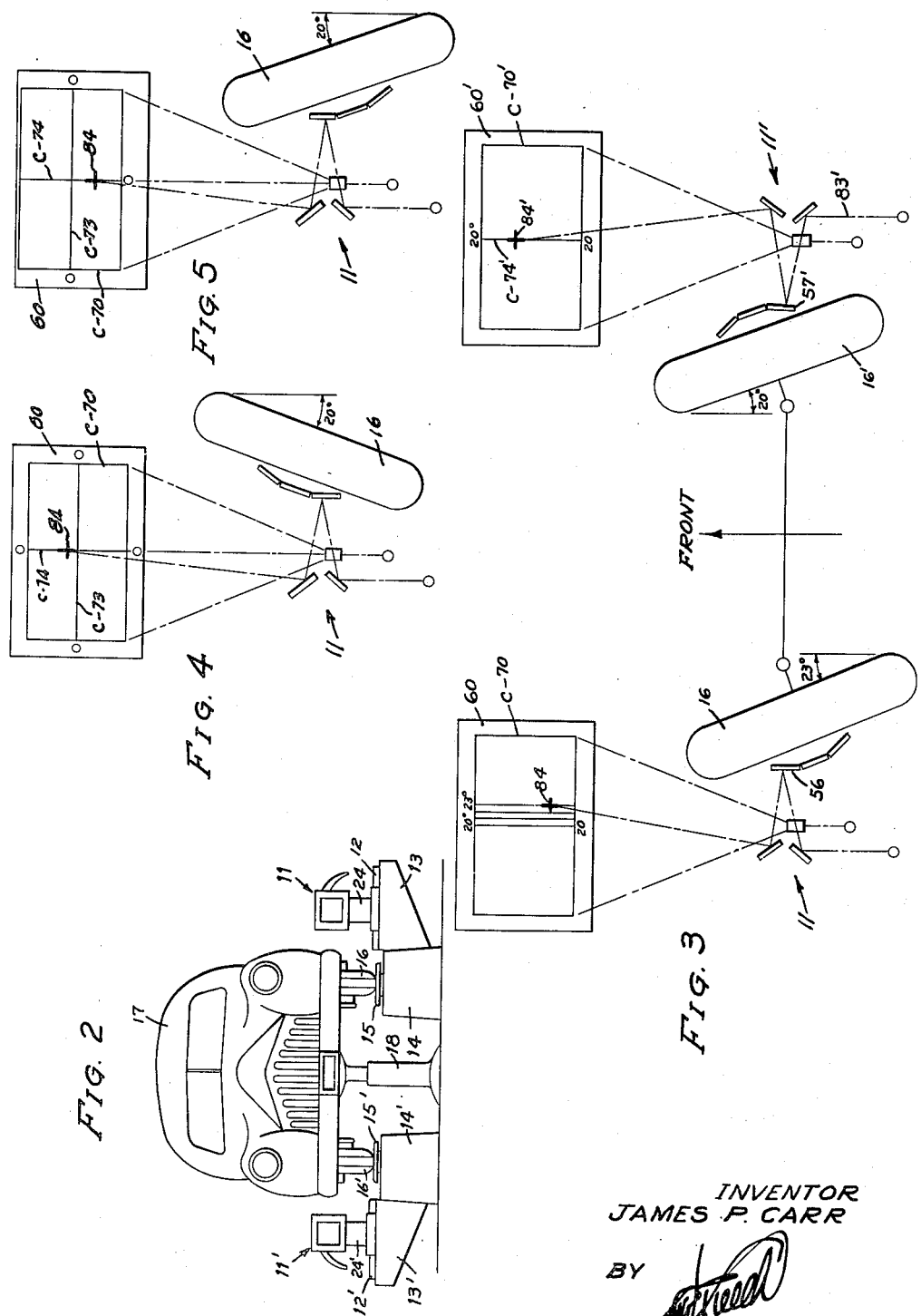

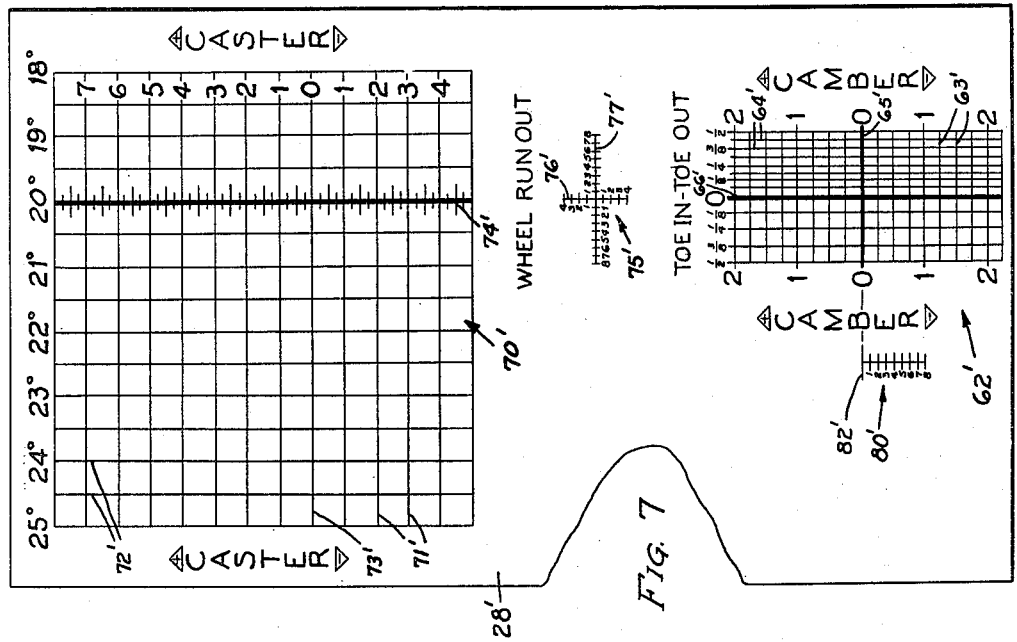
Fig. 7
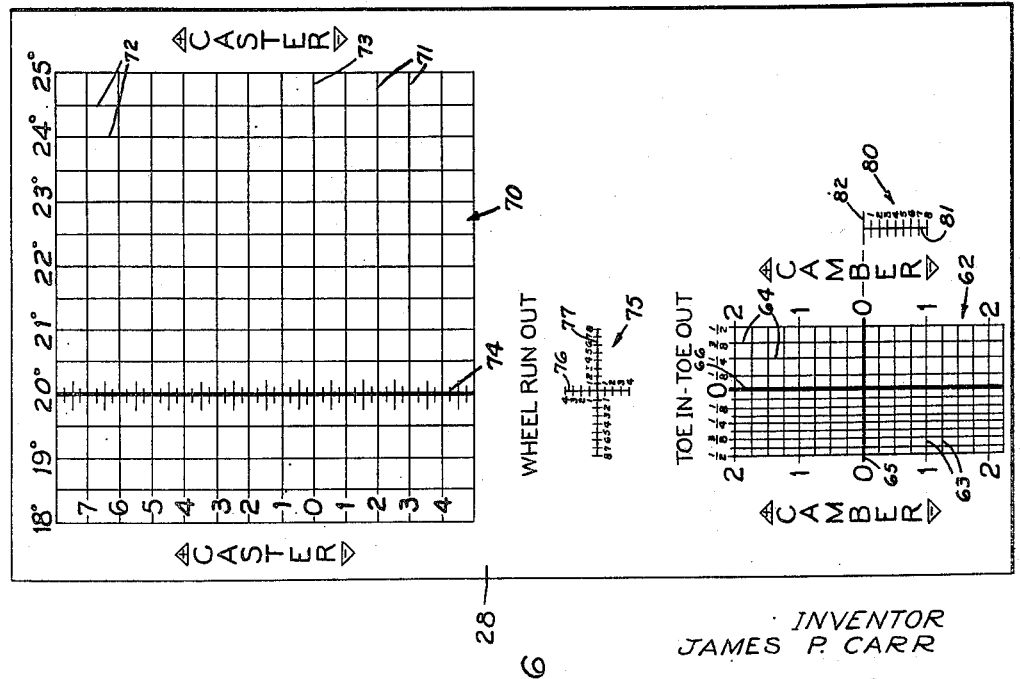
Fig. 6
INVENTOR
JAMES P. CARR
BY
ATTORNEY

J. P. CARR 2,667,805

MIRROR AND LIGHT BEAM APPARATUS FOR CHECKING
WHEEL ALIGNMENT CHARACTERISTICS WITH
CORRECTION FOR RUN-OUT

Filed Nov. 30, 1949

INVENTOR
JAMES P. CARR

BY

ATTORNEY

Patented Feb. 2, 1954

2,667,805

UNITED STATES PATENT OFFICE 2,667,805

MIRROR AND LIGHT BEAM APPARATUS FOR CHECKING WHEEL ALIGNMENT CHARACTERISTICS WITH CORRECTION FOR RUN-OUT

James P. Carr, Lansing, Mich., assignor to Food Machinery and Chemical Corporation, San Jose, Calif., a corporation of Delaware Application November 30, 1949, Serial No. 130,188

5 Claims. (Cl. 88—14)

This invention is an improvement on that disclosed in the co-pending application of Myrton L. Vandermeer, Serial No. 38,616, filed July 14, 1948, and entitled Mirror and Light Beam Wheel Checking Apparatus and Method of Correcting for Run-Out in Employing Same, now U. S. Patent No. 2,641,957, issued June 16, 1953.

The Vandermeer invention is directed to making corrections for run-out in the operation of a mirror and light beam wheel alignment characteristic measuring apparatus of the general type disclosed in the co-pending application of Roland E. Wilson, Serial No. 571,717, filed January 5, 1945, and entitled Mirror and Light Beam Wheel Alignment Characteristic Measuring Device, now Patent No. 2,496,324, issued February 7, 1950.

It is an object of the present invention to provide an apparatus of the Wilson type, in the operation of which correction for run-out may be made with relative precision and ease.

The manner of accomplishing the foregoing object as well as further objects and advantages will be made manifest in the following description taken in connection with the accompanying drawings in which:

Fig. 2 is a diagrammatic front elevational view of the apparatus shown in Fig. 1 and illustrating the manner in which the optical units thereof are related to an automobile while measuring the alignment characteristics of a front wheel of the latter.

Fig. 3 is a diagrammatic plan view of a pair of dirigible wheels and illustrates the apparatus shown in Fig. 1 and related thereto as when measuring the steering geometry of said wheels.

Figs. 4 and 5 illustrate respectively initial and final steps in the operation of said apparatus in the measurement of caster.

Fig. 6 is a face view of a chart slide for charts employed in association with the left optical unit of said apparatus.

Fig. 7 is a view similar to Fig. 6 in illustrating the corresponding slide associated with the right optical unit of said apparatus.

Figure 11:
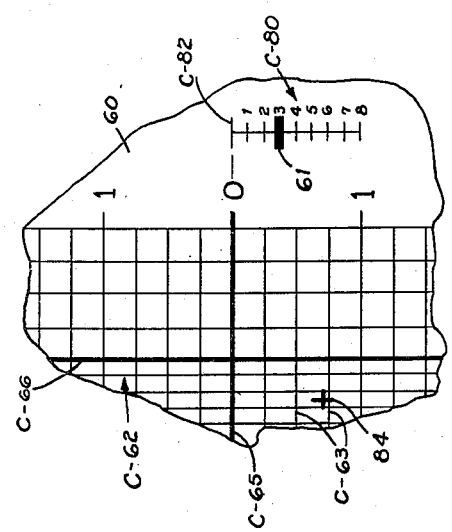

Fig. 11 is an enlarged fragmentary view of a portion of a screen of the invention and of a reference chart of the invention projected thereon and illustrating a magnet or other marker applied to said screen to mark a given value on said reference chart as the latter is first projected in its normal position on said screen. This view also shows projected on said screen a portion of the left camber chart, the zero line of which coincides with that of said reference chart.

Figure 12:
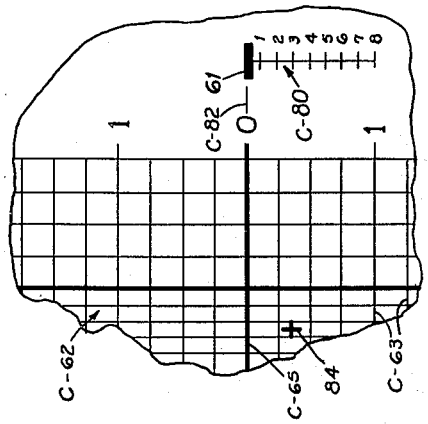

Fig. 12 is a view similar to Fig. 11 and illustrates the positions of said reference chart and said fragment of said camber chart after said charts have been lowered on said screen to bring said zero lines of said camber and said reference charts into coincidence with said magnet.

Figure 1:
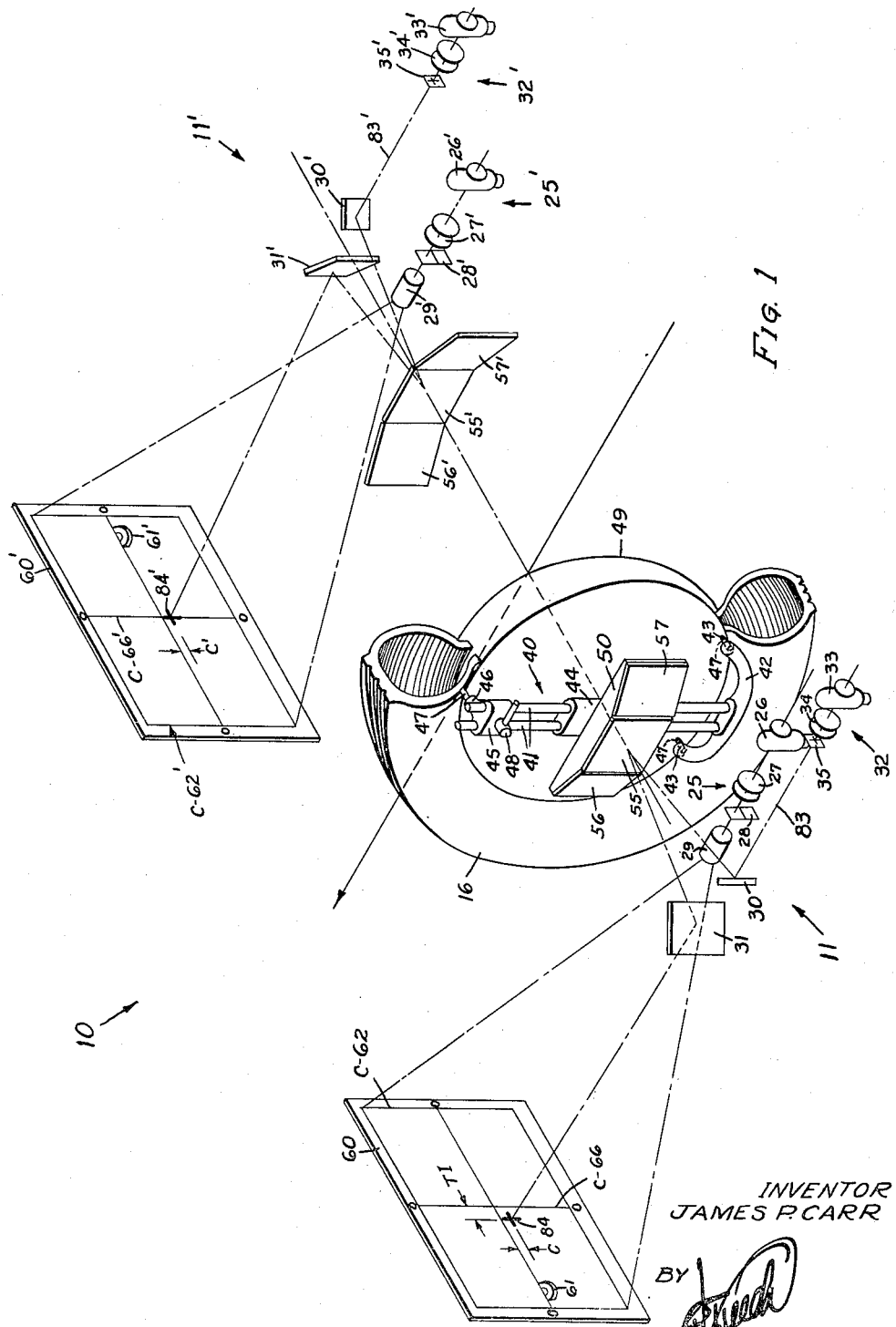
Fig. 1 is a diagrammatic perspective view of a preferred embodiment of the invention incorporated in a wheel alignment measuring apparatus of the Wilson type.

Referring specifically to the drawings, Figs. 1 and 2 diagrammatically show a mirror and light beam dirigible wheel alignment characteristic measuring apparatus 10, which includes left and right optical units 11 and 11' which are slideable horizontally towards and away from each other on slides 12 and 12' provided on brackets 13 and 13' which project laterally from wheel supporting pedestals 14 and 14', the latter being fastened securely to the floor.

The pedestals 14 and 14' are provided with turn-tables 15 and 15' for supporting the dirigible front wheels 16 and 16' of an automobile 17, there being a suitable ramp (not shown) upon which this automobile may be driven to position the front wheels thereof on the turn-tables 15 and 15' as shown in Fig. 2.

A jack 18 is provided for lifting the front end of automobile 17 when it is desired to suspend wheels 16 and 16' for free rotation.

The optical units 11 and 11' are reverse duplicates of each other, and identical accessory equipment is associated with each so that a description of unit 11 and its associated equipment will suffice for both of these units. Subsequent references to parts of the unit 11' and its associated equipment will be made by use of the reference numerals applied to corresponding parts of unit 11 and its accessories, with prime attached.

Unit 11 includes a base 24 on which is mounted a chart projector 25 having a lamp 26, condenser lenses 27, a vertically shiftable chart film slide 28 and a projection lens 29.

Also mounted on base 24 are mirrors 30 and 31 and a light beam projector 32 having a lamp 33, condenser lenses 34 and a cross-hair mirror 35.

Associated with the unit 11 is a mirror mount 40, the detailed structure of which is fully disclosed in U. S. Letters Patent No. 2,475,502. This mount includes a pair of bars 41 fixed in a bracket 42 on which are formed jaws 43. Slideable on the bars 41 is a mirror support 44 and a clamp 45 on which is provided a jaw 46. Each of the jaws 43 and 46 has an inner face, these faces lying in a plane which is parallel with the plane of the bars 41, these jaws having teeth 47 in the form of hardened screws extending inwardly from said faces.

The clamp 45 has a cam 48 which is manually operable when the mirror mount 40 has been positioned as shown in Fig. 1 on the rim 49 of the wheel 16 to sink the teeth 47 into this rim and thereby secure the mount 40 in place on the rim with the inner faces of the jaws 43 and 46 snugly bearing against the peripheral outer flange of the rim 49.

Pivotally mounted on the support 44, on an axis perpendicular with the plane of the bars 41, is a wheel mirror assembly 50. Fixed on this assembly, with its reflecting surface parallel with said plane, is a lateral wheel mirror 55 while wing mirrors 56 and 57 are also fixed thereon, the latter being slanted away from the lateral mirror 55 at angles of 20° therewith.

The axis on which the assembly 50 is pivoted on the support 44 is above its center of gravity so that the assembly 50 remains horizontal when the wheel 16 is rotated.

Also associated with the unit 11 is a screen 60 which is supported in vertical position and preferably in a plane perpendicular to the axis of the projector 25 and disposed symmetrically relative to the vertical plane containing said axis. The screen 60 is made of a magnetic material such as sheet steel and is provided with a permanent horseshoe magnet 61 which adheres to the front face of the screen 60 in any position in which it may be placed thereagainst (as shown in Fig. 1).

The chart film slide 28 is provided with a plurality of chart miniatures which may be selectively projected in enlarged form as a chart on the screen 60 by shifting the slide 28 vertically to vary the portion thereof exposed to the rays of light impinging upon said slide in the projector 25. Fig. 6 shows slide 28 with the chart miniatures thereon in upright positions so that these are legible, although it is to be understood that in the projector 25 this slide is inverted from the position in which it is shown in Fig. 6 so that the image projected on the screen 60 from the projector 25 may be upright.

The slide 28 thus has provided thereon a miniature camber and toe chart 62 having horizontal camber calibrations 63 and vertical toe calibrations 64. The camber calibrations include a horizontal zero line 65 and the toe calibrations include a vertical zero line 66.

Slide 26 also has a miniature caster chart 70 which includes horizontal caster calibrations 71 and vertical steering geometry calibrations 72.

The caster calibrations 71 are positive and negative in character, extending upwardly and downwardly from a horizontal zero line 73. The steering geometry calibrations 72 are adapted for measuring in degrees the angle of turn of one wheel when the other wheel is turned 20° from straight ahead and these calibrations include a 20° reference line 74 which is in alignment with the zero line 66 of the chart 62.

The slide 28 also carries a miniature wheel run-out chart 75 having vertical and horizontal reference lines 76 and 77 which intersect. Location of the wheel run-out chart miniature on the slide 28 is optional, but it is preferably placed between the camber chart 62 and caster chart 70 with the vertical reference line 76 in alignment with the vertical lines 66 and 74 of the camber and caster charts.

The reference lines of the wheel run-out chart are provided with relatively fine uniform calibrations which are numbered consecutively outwardly beginning with the intersection of the lines 76 and 77 as zero.

The slide 28 also has a reference chart 80 which is preferably placed alongside the camber chart 62 and includes a vertical reference line 81 and a horizontal reference line 82, the latter being preferably aligned with the horizontal zero line of the camber and toe chart 62. The reference line 81 of the reference chart 80 is provided with calibrations exactly like those on the chart 75 and which are numbered consecutively away from the zero line 82.

Operation

Figs. 1, 3, 4, 5, 8, 9, 10, 11, and 12 illustrate projections of one or the other of the miniature charts appearing on the slides 28 and 28' onto the screens 60 and 60'. Some of these projected charts are shown diagrammatically (Figs. 1, 3, 4, and 5) but even where the projections of these charts are shown in true proportion, there is a difference in identity between the projected charts and the chart miniatures of which the projected charts are merely optical enlargements. To distinguish between the chart miniatures and the projected charts, therefore, reference to the latter will be made by use of the same numerals as applied to the chart miniatures, but with these numerals prefaced by the letter "C," thus: C-70.

"Run-out" consists in any condition which causes the reflecting face of a middle wheel mirror to be out of perpendicularity with the axis of rotation of the wheel on which it is mounted. This is most commonly caused by the wheel being bent out of true perpendicularity with its axis. It might also be caused by improper application of the mirror mount onto the wheel.

To secure accurate results with the apparatus 10 when any run-out exists, it is necessary to make a correction for this run-out before starting to measure alignment characteristics with the apparatus. The present invention provides a device for accomplishing this rapidly and easily in the following manner.

Having applied the mirror mounts 40 and 40' to the wheels 16 and 16' respectively with the automobile 17 positioned as shown in Fig. 2, the optical units 11 and 11' are energized and shifted to the proper spaced relation with the wheel mirrors 55 and 55' and with the wheels turned straight ahead.

With the units 11 and 11' thus energized, the projectors 25 and 25' project charts on the screens 60 and 60' in accordance with the positions of the slides 28 and 28' in these projectors. At the same time the projectors 32 and 32' project light beams 83 and 83' against mirrors 30 and 30' from which they are reflected onto wheel mirrors 55 and 55' from which they are reflected back onto mirrors 31 and 31', and thence onto screens 60 and 60' to form cross-hair indicator images 84 and 84'.

Correction for run-out is made in the same manner for each of the wheels 16 and 16', so that a description of how this correction is made for the left wheel 16 will suffice for both.

Figure 8:
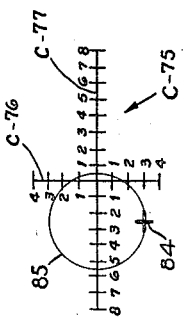
Fig. 8 is an enlarged view of the wheel run-out chart of the invention after a vertical adjustment has been made between said chart and the center of a wobble circle to bring said center onto the horizontal zero line of said chart.

The front left corner of the automobile 17 is now lifted by the jack 18 to free the wheel 16 for manual rotation. The slide 28 is adjusted in the projector 25 to project chart C-75 onto the screen 60 as shown in Fig. 8 and the wheel 16 is manually rotated. Assuming that there is a substantial degree of run-out in this wheel requiring compensation therefor in the apparatus 10, the indicator image 84 projected on the screen 60 by the projector 32 will inscribe a wobble circle 85.

When first projected, this will probably be centered on neither of the vertical and horizontal reference lines C-76 and C-77. By vertical adjustment of the slide 28 within the projector 25 while the wheel 16 continues to rotate, the chart C-75 is raised or lowered to center the wobble circle 85 on the horizontal reference line C-77 of this chart.

Figure 9:
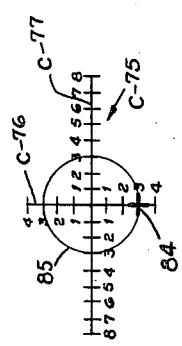
Fig. 9 is a view similar to Fig. 8 illustrating the appearance of said wobble circle relative to said chart when said circle has been shifted horizontally to bring the center of said circle into coincidence with the axial center of said chart.

This having been accomplished, as shown in Fig. 8, and with the wheel still rotating, the latter is turned by use of the steering gear to bring the center of the wobble circle 85 into coincidence with the intersection of the vertical reference line C-76 of the chart C-75 (Fig. 9).

Figure 10:
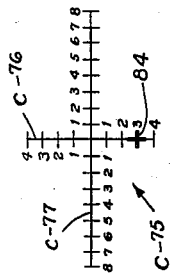
Fig. 10 is a view similar to Fig. 9 and illustrates the relationship of the indicator image produced by the apparatus on said run-out chart after rotation of the wheel producing said circle has been halted with said indicator image resting on the vertical axis of said chart below the center of the latter.

The rotation of the wheel 16 is now slowed down manually and the wheel halted with the indicator image 84 located on the vertical reference line C-76 below the reference line C-77 as shown in Fig. 10. In the example here illustrated, the radius of the wobble circle 85 is thus shown, by the calibrations on the vertical reference line C-76, as having a length of three units.

With the wheel 16 thus positioned, it is lowered onto the platform 15 and the slide 28 raised to its upper limit in the projector 25 to project a camber chart C-62 onto the screen 60 as shown in Fig. 11, and with the camber chart properly positioned for measuring camber of wheel 16 when there is no run-out in this wheel.

In the present instance, however, it has been ascertained that there is enough run-out in the left wheel 16 to produce a wobble circle 85 with a radius of three, and the wheel 16 has been halted and lowered with the indicator image at the lower end of a vertical diameter of said wobble circle. As the compensation sought will be effected by bringing the chart C-62 in the same relation with the indicator image 84 as it would have if there were no run-out, it is desired to point out that in the latter case the indicator image would fall exactly at the center of the wobble circle 85 which is produced by run-out when present. With the wheel 16 halted as above described, this desired relationship between chart C-62 and the indicator image 84 will be accomplished by lowering the chart C-62 from its normally correct position with reference to the indicator image 84, a distance equal to the radius of the wobble circle 85.

The reference chart C-80 shown in Figs. 11 and 12 is provided to facilitate this adjustment of the camber chart. The adjustment is accomplished by first moving the slide 28 downwardly against its limit stop which results in camber chart C-62 and its companion reference chart C-80 being projected onto the screen 60 at the correct level for measuring camber of the wheel 16 when there is no run-out.

The magnet 61 is now applied to the screen 60 as shown in Fig. 11 to overlie the projected reference chart C-80 at the calibration thereof measuring the radius of the wobble circle 85, which in the present instance has a value of three units.

The slide 28 is now moved upwardly away from its limit stop to lower the charts C-62 and C-80 until the zero line C-82 of the chart C-80 coincides with the position of the magnet 61. The camber chart C-62 is now properly related to the indicator image 84 for the measurement of camber of the wheel 16, this measurement being indicated by the location on the camber chart of said indicator image (Fig. 12) with reference to the horizontal calibrations C-63 thereof.

After correction for run-out on the wheel 16' has also been made, the camber of this wheel will then be indicated by the position of the indicator image 84' on the chart C-62'. It is to be noted that with the correction for run-out thus effected for both wheels 16 and 16', the indicator images 84 and 84' are correctly related to all of the vertical calibrations on the charts C-62—62' and C-70—70' respectively, which are employed for the measurement of other alignment characteristics by the apparatus 10. Thus no further correction than that already made for run-out is necessary in order to use this apparatus for the measurement of toe-in, toe-out, or caster.

In the measurement of caster, no compensation for run-out is necessary. This is accomplished therefore, with apparatus 10, exactly as disclosed in the aforesaid Wilson application. Briefly, this operation, shown in Figs. 4 and 5, when measuring the caster of wheel 16 is as follows: The wheel 16 is first turned inwardly from straight ahead to reflect the beam 83 from the rear wing mirror 57 and to bring the indicator image 84 onto the reference line C-74 of the caster chart C-70. Next the slide 28 is shifted vertically to bring horizontal zero line C-73 into coincidence with said indicator image. Then the wheel 16 is turned outwardly to cause the beam 83 to impinge on front wing mirror 56 and the indicator image 84 to again fall on line C-74. The amount of caster of wheel 16 is now measured by the distance the said image is spaced away from the zero line C-73. Thus vertical deflection of the indicator image 84 caused by run-out is the same in both of the readings taken in determining caster of a given wheel so as to make no practical difference in the accuracy of the measurement of this characteristic. Run-out may thus be disregarded in measuring caster.

The measurement of camber and toe-in is diagrammatically illustrated in Fig. 1, the measurements for camber for the wheels 16 and 16' respectively being indicated by the dimension lines TI on the chart C-62 when the indicator image 84' is placed on the vertical reference line C-66' of the chart C-62'.

The manner of measuring steering geometry or toe-out is diagrammatically illustrated in Fig. 3. This is accomplished by turning one of the wheels, as for instance the right wheel 16', inwardly 20° or until the light beam 83' is deflected from the rear wing mirror 57' to cause the indicator image 84' to fall on the vertical reference line C-74' of the right caster chart C-70'. This will cause the left wheel 16 to be turned outwardly a greater angle than the wheel 16' is turned inwardly, the turning angle of the wheel 16 now being measured by the location of the indicator image 84 on the caster chart C-70. In the example illustrated, this angle is seen to be 23°.

Corrections in caster of the wheels 16 and 16' indicated as necessary by the measurement of the values as just described sometimes necessitates the application of tools to the axle and the twisting of an end portion of an axle relative to the middle portion of the latter.

When such corrections are made, they sometimes disturb the camber and toe, making advisable a recheck of the latter characteristics. Such a recheck may be effected without again jacking up the wheels 16 and 16' by virtue of the fact that the magnets 61 and 61' are still located in the positions in which the zero lines C-82 and C-82' of the reference charts C-80 and C-80' must be located in order for the camber charts to give correct readings for camber of the wheels 16 and 16'.

To make a recheck of camber and toe-in, it is thus only necessary to return the slides 28 and 28' to their positions in the projectors 25 and 25' where the zero lines C-65 and C-65' of the camber charts coincide with the positions marked by the magnets 61 and 61'. With the wheels 16 and 16' turned straight ahead, correct readings for camber thereof appear immediately upon the charts C-62 and C-62' and with the indicator image 84' on vertical zero line C-66', the distance TI on chart C-62 again offers a measurement of the angle of toe-in.

The claims are:

1. An apparatus for measuring camber and toe alignment characteristics of dirigible wheels of a vehicle which comprises wheel mirrors, one of which is fastened on each of said wheels, each of said mirrors being held by its mounting with its plane in a fixed relation with the rotational axis of said wheel and with said mirror facing laterally from said wheel; a screen for each of said wheels; means providing a camber and toe chart on each of said screens, each such chart having horizontal and vertical sets of calibrations for respectively measuring camber of the wheel with which said chart is associated, and toe of said pair of wheels; means optionally operable to render either of said wheels rotatable about its axis and operable at will to hold either of said wheels against such rotation in any selected position to which said wheel has been thus rotated; projector means for projecting a beam of light against each of said mirrors so that with said wheels turned substantially straight ahead, said beams, after reflection from said wheel mirrors, fall on said screens; means for providing a run-out chart on each of said screens in a fixed relation with the camber and toe chart thereof, each of said run-out charts having calibrated intersecting vertical and horizontal reference lines, the calibrations on said reference lines reading outwardly from a zero center point thereof at the intersection of said reference lines, and being spaced apart at such close intervals as to readily measure the radius of a wobble circle centered at said intersection; means for providing a reference chart on each of said screens, each such reference chart having a reference line which is spaced from and parallel to one of the sets of calibrations on said camber and toe chart, and having calibrations of the same order as the aforesaid calibrations on said wheel run-out chart, said reference chart calibrations beginning at a zero line crossing the reference line of said reference chart; and a marker, applied when in use, to one of said screens opposite one of the calibrations of said reference chart thereof to indicate on said reference chart the radius of a run-out wobble circle determined by superimposing said circle on said run-out chart.

2. A combination as in claim 1 in which said screens are formed of magnetized material and in which said marker comprises a magnet.

3. A combination as in claim 2 in which the camber calibrations of said camber chart and the calibrations of said reference chart have a common zero line.

4. An apparatus for measuring an alignment characteristic of one of a pair of dirigible king-pin mounted wheels of an automobile, and compensating for runout, which comprises: a mirror mounted on said wheel when in use and facing laterally therefrom; an optical system disposed alongside said automobile and mounted independently thereof close to said wheel mirror, said system including a device for projecting a light beam against said mirror; a screen disposed to intercept said beam, to form an indicator image in a given field thereon, after said beam has been reflected from said mirror, said system also including a chart projector for projecting an alignment characteristic measuring chart onto said screen in said field, said chart having calibrations for measuring said characteristic by the location of said indicator image in said field with said wheel turned to a given position about its king-pin; means operable at will to render said wheel rotatable about its axis and optionally operable to hold said wheel against rotation in any selected position to which said wheel has been thus rotated; means associated with said chart projector for projecting a separate runout chart on said screen in a fixed relation with the alignment characteristic measuring chart thereon, said run-out chart having calibrated intersecting vertical and horizontal reference lines, the calibrations on said reference lines reading outwardly from a zero center point thereof at the intersection of said reference lines, and being spaced apart at such close intervals as to readily measure the radius of a wobble circle centered at said intersection; a shiftable marker having means causing it to removably adhere to said screen for marking by its position on said screen the distance it is necessary to move said measuring chart to correct said reading thereon for run-out; and manually controlled means embodied in said chart projector for simultaneously shifting said charts to effect said correction.

5. A combination as in claim 4 in which said chart shifting means embodies a stop which indicates when said measuring chart is in its normal measuring position; and means embodied in said projector for also projecting on said screen in a fixed parallel relation with said measuring chart, a reference chart which is calibrated along its length and is adapted for use with said marker to indicate a corrected position to which it is necessary to shift said measuring chart to make correction for runout.

JAMES P. CARR.

References Cited in the file of this patent

UNITED STATES PATENTS

| Number | Name | Date |
|---|---|---|
| 1,491,962 | Moody | Apr. 29, 1924 |
| 2,346,582 | Insler et al. | Apr. 11, 1944 |
| 2,410,339 | Creagmile | Oct. 29, 1946 |
| 2,470,090 | Carrigan et al. | May 17, 1949 |
| 2,496,324 | Wilson | Feb. 7, 1950 |